United States Patent [19]
Yamaguchi

[11] Patent Number: 5,424,507
[45] Date of Patent: Jun. 13, 1995

[54] CONTROLLING WORKING GAS FLOW RATE AND ARC CURRENT LEVEL IN PLASMA ARC CUTTING MACHINE

[75] Inventor: Yoshihiro Yamaguchi, Hiratsuka, Japan

[73] Assignee: Kabushiki Kaisha Komatsu Seisakusho, Tokyo, Japan

[21] Appl. No.: 230,597

[22] Filed: Apr. 21, 1994

[51] Int. Cl.⁶ .............................................. B23K 9/00
[52] U.S. Cl. ........................... 219/121.44; 219/121.39; 219/121.54; 219/121.55; 219/121.57
[58] Field of Search ....................... 219/121.39, 121.44, 219/121.48, 121.59, 121.54, 121.57, 121.55

[56] References Cited

U.S. PATENT DOCUMENTS

| | | | |
|---|---|---|---|
| 4,816,637 | 3/1989 | Sanders et al. | 219/121.59 |
| 5,017,752 | 5/1991 | Severance, Jr. et al. | 219/121.59 |
| 5,070,227 | 12/1991 | Luo et al. | 219/121.55 |
| 5,166,494 | 11/1992 | Luo et al. | 219/121.55 |
| 5,235,162 | 8/1993 | Nourbakhsh | 219/121.54 |

FOREIGN PATENT DOCUMENTS 47-30496  8/1972  Japan .
5-104251  4/1993  Japan .

Primary Examiner—Mark H. Paschall
Attorney, Agent, or Firm—Richards, Medlock & Andrews

[57] ABSTRACT

A plasma arc cutting machine which utilizes oxygen as a working gas is controlled to provide: a long electrode life without serious electrode wear even if the starting operation of the arc is repeated frequently; a smooth transition from a pilot arc to a main arc even when a thin plate is cut; and a low noise characteristic. A first stop valve (4) is connected in parallel with a serially connected second stop valve (7) and a gas flow regulating means (6) between a supply of working gas and a plasma torch (1). In response to a start signal $S_T$, the second stop valve (7) is opened so as to supply the working gas at a small flow rate $Q_P$ to the plasma torch (1) via the gas flow regulating means (6). After a pilot arc is started, the first stop valve (4) is gradually opened so as to gradually increase the flow rate of the working gas from the small flow rate $Q_P$ up to a normal flow rate $Q_M$, and at the same time, the pilot current is gradually increased from an initial pilot current level $I_S$ to a pilot current level $I_P$, corresponding to the gradual increase in the flow rate of the working gas up to the normal flow rate $Q_M$. In response to a stop signal $S_P$, the arc current is gradually reduced from the cutting current level $I_M$ to a lower level $I_D$ at which the main arc (13) is extinguished.

23 Claims, 6 Drawing Sheets

CONTROLLING WORKING GAS FLOW RATE AND ARC CURRENT LEVEL IN PLASMA ARC CUTTING MACHINE

FIELD OF THE INVENTION

The present invention relates to a method and apparatus for controlling a plasma arc cutting machine which uses a plasma arc, generated between an electrode and a workpiece, to cut the workpiece.

BACKGROUND OF THE INVENTION

A plasma cutting machine comprises an electrode and a nozzle, wherein the nozzle provides a path between the nozzle and the electrode through which a working gas can flow and be directed toward the object to be cut. While the working gas is being supplied, a pilot arc is initially generated between the electrode and the nozzle, and then a main arc, which is a hot plasma arc, is generated between the electrode and the object to be cut, thereby cutting the object.

A known technique to control a plasma arc cutting machine will be described first. In the following description, it will be assumed that gaseous oxygen is used as the working gas. FIG. 6 illustrates a configuration of a typical conventional plasma arc cutting machine. FIG. 7 is a timing chart showing the sequence of operations. In response to a start signal $S_T$ inputted to the plasma arc cutting machine, a constant current source 8 is turned "on" and a switch 10 is closed, whereby a negative DC voltage is applied to an electrode 1a in a plasma torch 1, and a positive DC voltage is applied to the nozzle 1b of the plasma torch 1 and to a workpiece 11 to be cut. At the same time, a stop valve 4 is opened and a preflow of gaseous oxygen is supplied from a gas source to the inside of the plasma torch 1 via a gas flow line 2 containing a pressure regulator 3 and the stop valve 4. The preflow is supplied for a suitable period of time so as to replace any air in the gas supply pipe 2 with oxygen. This preflow period also provides time for the gas flow to settle to a stable state.

After the preflow period, a high frequency generator 9 is turned on, and a high frequency high voltage is applied between the electrode 1a and the nozzle 1b, whereby a spark discharge occurs between the electrode 1a and the nozzle 1b. This spark discharge induces a pilot arc between the electrode 1a and the nozzle 1b. The formation of the pilot arc creates a closed circuit path starting from the positive terminal of the constant current source 8 and passing through a resistor 12, the switch 10, the nozzle 1b, the pilot arc, the electrode 1a, and finally returning to the negative terminal of the constant current source 8, whereby a pilot current $I_P$ begins to flow through this path. At this stage, the constant current source 8 is in a state where it can output maximum power, or in other words, it acts as a constant voltage source. The resistor 12 provides a drooping characteristic, whereby the pilot current $I_P$ settles to a steady state value at which the arc voltage is balanced with the characteristics of the constant current source 8.

Thus, an electrical path between the electrode 1a and the nozzle 1b is established by the pilot arc. Then, a part of the arc current begins to flow toward the workpiece 11, whereby a main arc 13 is created. When a current detector 14c detects the creation of the main arc 13, the switch 10, which is connected between the constant current source 8 and the nozzle 1b, is opened, whereby the current path including the nozzle 1b is disconnected, and the current will flow only via the path including the main arc 13 and the workpiece 11. Subsequently, a cutting current $I_M$ detected by the current detector 14c is compared to a predetermined value, and the cutting current $I_M$ is controlled so that it is maintained substantially constant at the predetermined value. When a cutting or other required operation is complete, a stop signal $S_P$ is applied to the constant current source 8 so as to terminate the supply of power to the main arc 13, whereby the main arc 13 is extinguished. In this way, a desired cutting operation is performed.

However, whenever a plasma arc cutting machine requires a greater current, various problems arise. That is, the increase in arc current gives rise to an increase in electrode wear; degradation in the transition from a pilot arc to a main arc; and an increase in the noise level of the plasma arc cutting machine.

First, the problem of electrode wear will be described. As the electrode material of the electrode 1a in the plasma torch 1 is directly exposed to the hot main arc 13, it is common to embed the electrode material in a holder that is cooled by water. In a plasma arc cutting machine that utilizes gaseous oxygen as the working gas, the electrode material can be either hafnium or zirconium, which can form an oxide having a high melting point. However, even if cooling of the electrode 1a is performed, and/or if a high melting point material is used for the electrode 1a, it is impossible to avoid the electrode wear. The greater the arc current is, the more serious is the electrode wear.

The electrode wear also strongly depends on the number of times the arc has been started. For example, as represented by the solid line P1 in FIG. 8, when cutting is done by a conventional oxygen plasma arc machine with a high current such as 250 A, if the number of start-up operations is about fifty, the electrode can be used for only about 3 hours in total accumulated arc time. This means that if the current becomes as high as 250 A, then the life of the electrode becomes as short as only 3 hours. If the start-up operation is repeated 400 times wherein each start-up operation is accomplished within a few seconds, the electrode can be used for only about twenty minutes in accumulated total arc time.

Now, the problem with arc transition will be described. When a thin plate is to be cut by utilizing a plasma arc cutting machine designed for thick plates, there are two options: one is to directly perform the cutting of the thin plate with the normal high arc current; the other one is to switch the arc current to a lower value. In the former case, the cutting should be done at a high speed to avoid overheating. However, the quality of the high speed cutting is limited as it is dependent on the tracking accuracy of a robot or an XY table on which the torch is installed. If this limitation does not permit the achievement of the desired cutting accuracy, there is no choice but to employ the latter technique. In the latter technique, a smaller size nozzle with a smaller orifice diameter is used, and the cutting is performed at a low speed with a low arc current which matches the smaller nozzle size. However, if the nozzle is damaged by a pilot arc, degradation in the cutting quality occurs immediately. If the voltage difference between the nozzle and a workpiece to be cut is great enough, then a high current flows through the workpiece when a pilot arc reaches the workpiece, and it is possible to generate a main arc for a short time even if the nozzle is at a rather high position above the workpiece. However, as can be seen from FIG. 6, the voltage difference between the nozzle 1b and the workpiece 11 is determined by the product of the resistance 12 and the pilot current $I_P$. If the pilot current $I_P$ is reduced to match the smaller nozzle diameter, then the voltage difference between the nozzle 1b and the workpiece 11 also decreases, which gives rise to difficulty in the transition from the pilot arc to the main arc.

One known technique to reduce the electrode wear is to reduce or stop the working gas flow around an electrode just before a main arc is stopped (for example, refer to U.S. Pat. No. 5,070,227). However, a certain time delay in controlling the working gas flow is inevitable. In contrast, an electrical current can be controlled quickly. Even if a valve could be opened or closed instantaneously, the gas flow through the space between the nozzle and the electrode cannot change instantaneously due to the residual gas pressure in the portion of the gas supply pipe downstream of the valve. Therefore, after the cutting is complete, it is necessary to still maintain the arc until the gas flow reaches a low level at which the electrode wear is effectively reduced. As a result, after the cutting is complete, an additional portion of the workpiece will be cut wastefully. If the valve is disposed near the plasma torch, then the time required to reduce the gas flow will become short. However, this arrangement will give rise to difficulty in moving the plasma torch during its operation, and/or difficulty in installing the plasma torch on an XY table or on a robot.

In another known technique (for example, refer Japanese Patent No. 47-30496) to solve the problems with the arc transition, there is provided a gas supply control unit, comprising a flow regulating valve and a flow stop valve disposed in parallel, between a gas source and a plasma torch. A gas, such as nitrogen, having a large heat capacity compared to argon gas and which can also serve as cooling gas, is used as the working gas. A small flow rate of the working gas is supplied for a pilot arc, and the flow rate is increased to a sufficiently high level when a transition to a main arc is performed. According to this arrangement, the start-up of the pilot arc and the transition to a main arc can be performed easily. While this technique can improve the reliability in the start-up of a nitrogen plasma arc, the problem with electrode wear still remains unsolved for oxygen plasma. In this technique, the pilot current should be greater than a certain value in order to achieve the transition to the main arc. This increase in the pilot current will result in greater electrode wear for the oxygen plasma.

Noise is another problem in the prior art. If the thickness of a plate to be cut increases, it is necessary to increase the output current. However, an increase in the output current also increases the noise arising from the plasma. One known technique to reduce the noise is to immerse a workpiece in water, and perform the cutting in water (for example, refer to U.S. Pat. No. 4,816,637). In this technique, while the noise can be reduced, the workpiece can become corroded, and a large scale treatment associated with water is required.

SUMMARY OF THE INVENTION

An object of the present invention is to solve the problems described above. More specifically, it is an object of the present invention to provide a method and apparatus for controlling a high-current plasma arc cutting machine, which is characterized in that there is not much electrode wear even if the start-up of the arc is repeated frequently; a smooth transition from the pilot arc to the main arc is possible even if the cutting current or the pilot current is reduced to match a smaller nozzle diameter for cutting a thin plate; and the noise level is low.

First, the reasons for the electrode wear, concluded by an investigation carried out by the present inventor, will be described. Experiments carried out by the inventor of the present invention have revealed that when an arc is started, the surface temperature of the electrode rises quickly from room temperature to about 3000° C. Due to the thermal shock which occurs during the rapid temperature rise, abrasion occurs at the electrode surface, whereby the electrode wear occurs during a very short time. In other words, if this thermal shock is reduced, then the electrode wear will also be reduced. This can be achieved by starting a pilot arc with a low current, and then increasing the current gradually, thereby reducing the initial thermal shock, and thus reducing the electrode wear. However, if the pilot current is reduced in the manner described above, other problems will occur, as will be described below. The first problem is that a high-current plasma arc cutting machine requires a large oxygen flow rate, and thus such a low pilot current cannot maintain the pilot arc in a stable state, whereby the pilot arc might be extinguished before the transition to the main arc. The second problem occurs in the case of a piercing start when the cutting is started while the tip of the torch is at a low position with respect to the metal workpiece. Metal is rendered molten by the plasma arc, and the hot molten metal can be splattered by the arc. Some of the splattered molten metal can reach the nozzle due to the small distance between the nozzle and the workpiece, whereby the nozzle can be damaged. Therefore, in particular, if the plate to be cut is thick, a high pilot current is required so that the pilot arc can reach the plate to be cut from a high position. On the other hand, in the case of cutting a bevel for welding, it is necessary to incline the torch. To avoid any interference between the tip of the torch and the workpiece, it is necessary to have a sufficiently large space between the workpiece and the nozzle disposed along the center axis of the torch. As a result, it is necessary that the pilot current have a rather high value to ensure that the pilot arc can reach the workpiece from a large distance. In this case, if the pilot arc is too weak, it cannot reach the workpiece disposed at a large distance from the nozzle, whereas such a large distance is essential in the high-current plasma arc cutting. These problems will be solved according to first and second aspects of the present invention, which will be described below.

According to the first aspect of the present invention, a method of controlling a plasma arc cutting machine comprises the steps of: providing a first stop valve connected in parallel with a serially connected second stop valve and a gas flow regulating means between a working gas supply and a plasma torch; opening the second stop valve in response to a start signal $S_T$ to supply working gas at a small flow rate $Q_P$ through the second stop valve and the gas flow regulating means to the plasma torch while the first stop valve is still closed; starting a pilot arc; gradually opening the first stop valve so as to gradually increase the flow rate of the working gas from the small flow rate $Q_P$ up to a normal flow rate $Q_M$; gradually increasing a pilot current from an initial pilot current level $I_S$ to a normal pilot current level $I_P$ in response to the gradual increase in the flow rate of the working gas from the small flow rate $Q_P$ up to the normal flow rate $Q_M$. The arc current is then gradually increased from the normal pilot current level $I_P$ to a cutting current level $I_M$, and the main arc current is then maintained at the cutting current level $I_M$. When the cutting operation is complete, a stop signal $S_P$ causes the main arc current to be gradually decreased at a predetermined gradient from the cutting current level $I_M$ down to a lower level $I_D$, at which the main arc is extinguished.

In the arrangement described above, a preflow of the working gas is initially introduced into the plasma cutting machine at a small flow rate $Q_P$, and then the pilot arc is started with a small current value, i.e., the initial pilot current level $I_S$. However, this condition is not suitable for the transition to the main arc when the plasma torch is positioned at a large distance from the workpiece. Therefore, immediately after the pilot arc has been started, each of the gas flow rate and the pilot current is gradually increased, keeping the correspondence between these values, that is, the gas flow rate is increased from $Q_P$ to $Q_M$ and the pilot current is increased from $I_S$ to $I_P$. Owing to this, the pilot arc can be started in a state where the thermal shock to the electrode of the plasma torch is sufficiently low to reduce or avoid electrode wear, and then the gas flow and the arc current are gradually increased so as to make it possible to maintain the pilot arc in a more stable state. Furthermore, the arc current is also controlled in such a manner that it is gradually increased from the pilot current level $I_P$ to the cutting current level $I_M$, whereby the thermal shock which occurs during the transition from the pilot arc to the main arc can be reduced. Furthermore, because the main arc is extinguished only after reducing the main arc current from the cutting current level $I_M$ to the lower level $I_D$, the surface of the electrode is left in a state which will reduce the amount of electrode wear which occurs due to thermal shock when the next arc is started. The state of the electrode surface after extinguishing the arc will be discussed in more detail later in conjunction with the second aspect of the present invention. According to the first aspect of the present invention, the working gas flow and the arc current are controlled to predetermined values during the entire process from the starting of the pilot arc until the extinction of the main arc, whereby the electrode wear is drastically reduced.

According to the second aspect of the present invention, a method of controlling a plasma arc cutting machine comprises the steps of reducing the main arc current at a predetermined gradient from the cutting current level $I_M$ down to a lower level $I_D$ in response to a stop signal $S_P$, and extinguishing the main arc only after the main arc current has been reduced to the lower level $I_D$.

In this arrangement, the electrode wear can be reduced for the following reasons. The electrode wear, associated with the starting operation of an arc, occurs in such a manner that abrasion results from the thermal shock which occurs immediately after the arc has been started. The investigation carried out by the inventor of the present invention has revealed that the degree of the electrode wear depends on the state of the electrode surface before the starting of the arc. As a matter of course, the state of the electrode surface before the starting of the arc depends on the conditions at which the immediately previous arc was extinguished after the completion of a cutting operation.

The mechanism of the electrode wear will be described below referring to the prior art. In the prior art, when the stop signal $S_P$ is inputted, the power supply to the main arc is stopped by immediately turning off the constant current source. In this turning off process, the arc current decreases rapidly from the cutting current level $I_M$, at a gradient determined by a capacitor or reactor disposed in the constant current source, down to a low level at which the main arc is extinguished. This extinction process gives rise to rapid cooling of the electrode surface, which causes the formation of small cracks on the electrode surface. When the arc is started again, these cracks result in a reduction in the thermal conductivity of the electrode surface. As a result of the lower thermal conductivity, the magnitude of the thermal shock increases, causing an increase in the electrode wear.

In view of the above, in the second aspect of the present invention, instead of abruptly terminating the arc current from the cutting current level $I_M$ by immediately turning off the current source, the extinction of the main arc is achieved by the following steps: upon the inputting of the stop signal $S_P$, the main arc current is gradually reduced from the cutting current level $I_M$ down to the predetermined lower level $I_D$; then the main arc is extinguished by turning off the current source. Owing to this gradual reduction in arc current, the rapid cooling of the electrode during the extinction process of the arc can be avoided, whereby the cracking during the extinction process of the arc is prevented or at least substantially reduced, and thus any decrease in the thermal conductivity during the next arc starting process is reduced or avoided. As a result, an improvement in the electrode life can be achieved.

According to the third aspect of the present invention, there is provided a control apparatus which is characterized in that the cutting current level $I_M$ comprises a plurality of switchable cutting current levels $(I_M)_n$; the pilot current level $I_P$ comprises a plurality of switchable pilot current levels $(I_P)_n$ each corresponding to a respective cutting current level $(I_M)_n$; and the resistor is a variable resistor having values corresponding to the pilot current levels $(I_P)_n$.

In this arrangement, for example when the pilot current $I_P$ is reduced, the value of the resistance connected in series with the nozzle is increased corresponding to the reduction of the pilot current, whereby the voltage difference between the nozzle and the workpiece can be maintained substantially constant at a high value. As a result, the difficulty in the transition from the pilot arc to the main arc, which is a problem in the prior art, can be solved. This aspect of the present invention is particularly useful when a high-current plasma arc cutting machine is used at a low current level.

According to the fourth aspect of the present invention, there is provided a method of controlling a plasma arc cutting machine, which is characterized in that the frequency of the variation in the output current associated with the ON/OFF control of a switching device is higher than 12 kHz, and the magnitude of variations in the output current relative to the average value of the output current is less than 30%.

In this arrangement, the frequency of the current variations is higher than the more sensitive audible frequencies, and the magnitude of the current variations is reduced, whereby the noise can be drastically decreased. This reduction in the noise will be discussed further below. The noise generated by the plasma arc cutting machine depends strongly on the output current. That is, as the output current increases, the noise level increases. In particular, if the output current exceeds 200 A, the noise level increases abruptly over 100 dB (A) as measured at a location 1 m distant from the plasma torch. The spectrum analysis on the noise has revealed that while a constant current source can control the current substantially at a specified value, there are small variations (ripples) in the magnitude of the current, arising from the control of the current. The noise has a spectrum corresponding to the frequency of the variations in the current, which causes the high level of the noise. The present invention is based on the above investigation.

DESCRIPTION OF THE PREFERRED EMBODIMENTS

Referring to the accompanying drawings, preferred embodiments of a method of controlling a plasma arc cutting machine according to the first and second aspects of the present invention will be described in detail below.

Figure 1:
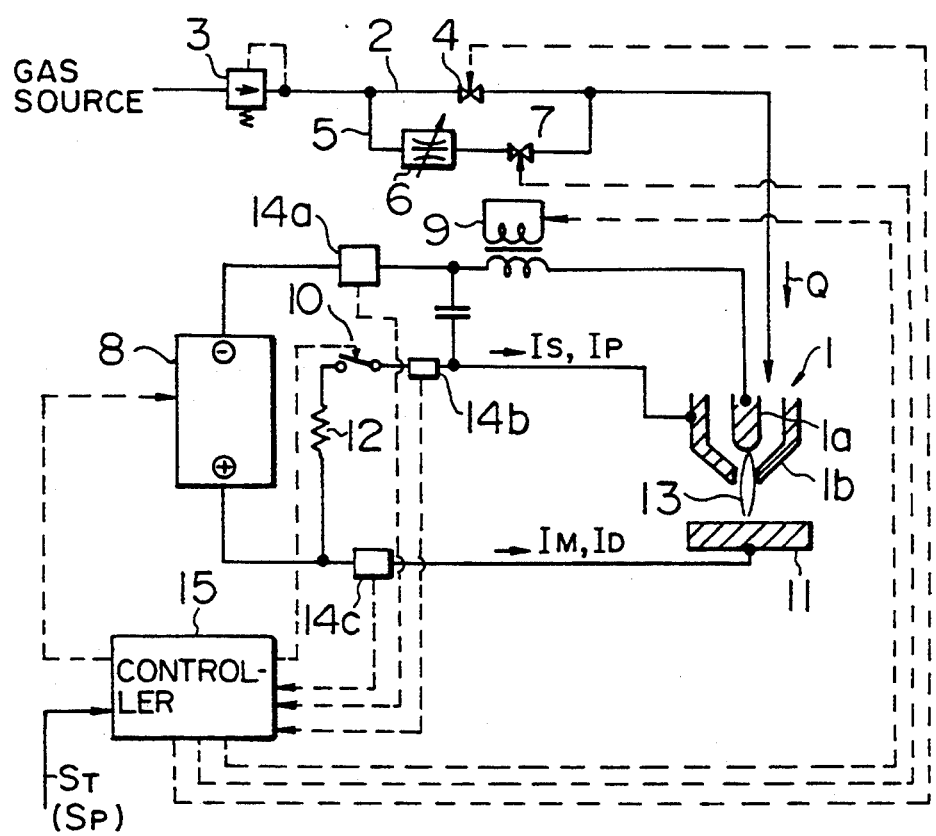
FIG. 1 is a schematic diagram illustrating a configuration of a plasma arc cutting machine according to first and second aspects of the present invention.

FIG. 1 illustrates a plasma arc cutting machine relating to the embodiments according to the first and second aspects of the present invention. As shown in FIG. 1, the machine comprises three major portions: a plasma torch 1; a working gas supplying system; and a control system. The plasma torch 1 comprises an electrode 1a and a nozzle 1b, wherein the nozzle 1b provides a path between the nozzle 1b and the electrode 1a for working gas to pass through and be directed towards the workpiece 11. The electrode 1a is electrically connected via a constant current source 8 to the nozzle 1b and a workpiece 11 so that a pilot arc can be generated between the nozzle 1b and the electrode 1a, and so that a main arc 13 can be generated between the electrode 1a and the workpiece 11, whereby the workpiece is cut with the plasma arc. The working gas supply system comprises a gas supply pipe 2 for supplying the working gas from a gas source to the plasma torch 1, wherein a pressure regulator 3 and a first stop valve 4 are connected in series in an intermediate portion of the gas supply pipe 2. The gas supply pipe 2 is further provided with a bypass pipe 5 disposed in parallel to the first stop valve 4, wherein the bypass pipe 5 is provided with gas flow regulating means 6 and a second stop valve 7. A gas flow regulator, an orifice, or the like can be used as the gas flow regulating means 6. The gas flow regulating means 6 controls the flow rate Q of the gas supplied to the plasma torch 1. The first stop valve 4 and the second stop valve 7 are used to supply and stop the flow of the working gas by open-and-close operation. As for the working gas, oxygen or an oxidative gas containing oxygen can be used. In the control system, a high frequency generator 9 and a total output current detector 14a are connected in series between the electrode 1a and negative terminal of the constant current source 8. A pilot current detector 14b, a switch 10, and a resistor 12 are disposed between the nozzle 1b and the positive terminal of the constant current source 8. A main current detector 14c is connected between the workpiece 11 and the positive terminal of the constant current source 8. The constant current source 8 supplies electric power to the plasma torch 1 in such a manner that the total output current is detected by the current detector 14a and the total output current is controlled so that the value detected by the current detector 14a is equal to a specified value. The pilot current detector 14b detects a pilot current between the nozzle 1b and the constant current source 8 ranging between an initial low pilot current $I_S$ and a subsequent higher pilot current $I_P$ which can provide a stable arc. Alternatively, these pilot current values can be detected by the output current detector 14a. The main or cutting current detector 14c detects a main current between workpiece 11 and the constant current source 8 ranging between a high level cutting current $I_M$ and a low level current $I_D$ which is provided after the cutting operation is complete. There is also provided a controller 15 which is connected to the working gas supplying system and the control system. A specified current value used to control the constant current source 8 and other required values are preset in the controller 15. When the pilot current detector 14b detects the pilot arc, the controller 15 increases the arc current at a predetermined rate from the initial pilot current level $I_S$ to the pilot current level $I_P$. At the same time, the controller 15 increases the gas flow rate Q from a low level $Q_P$ to a normal rate $Q_M$ at a predetermined rather slow rate of increase. Furthermore, when the main current detector 14c detects the generation of the main arc, the controller 15 increases the output current from the pilot current, level $I_P$ to a cutting current level $I_M$ at a predetermined gradual rate of increase. Finally, in response to a stop signal $S_P$, the controller 15 reduces the output current from the cutting current level $I_M$ to a lower level $I_D$ at a predetermined rather slow rate of decrease.

Figure 2:
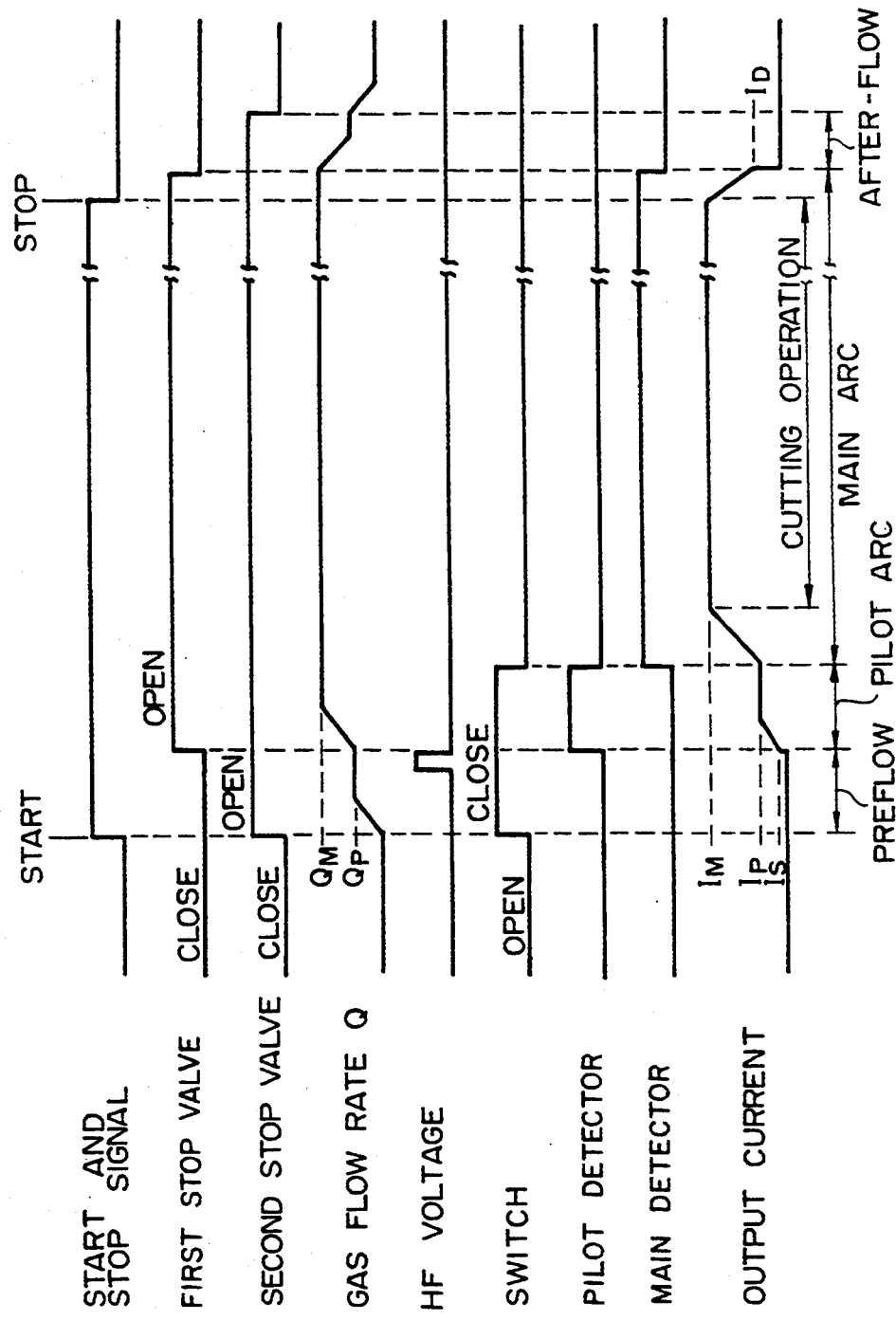
FIG. 2 is a timing chart illustrating the sequential control of the starting of an arc of the plasma arc cutting machine according to the first and second aspects of the present invention.

With the arrangement described above, the plasma arc cutting machine is controlled in a manner described below with reference to FIGS. 1 and 2, wherein FIG. 2 is a timing chart of the related sequential control. When a start signal $S_T$ is inputted to the controller 15, the constant current source 8 is turned on, and the switch 10 is closed, whereby a negative DC voltage is applied to the electrode 1a in the plasma torch 1, and a positive DC voltage is applied to the nozzle 1b as well as to a workpiece 11. At the same time, the second stop valve 7a is opened, whereby a preflow of oxygen gas is supplied to the inside of the plasma torch 1 via the gas flow regulating means 6 at a low flow rate $Q_P$ (e.g., about 10 liters/min). At this stage, the first stop valve 4 is still closed. After the preflow is complete, e.g. after about 2 seconds, the high frequency generator 9 is turned on, whereby a high frequency high voltage is applied between the electrode 1a and nozzle 1b. At this stage, because the working gas pressure in the plasma torch is still at a low level, breakdown occurs between the electrode 1a and nozzle 1b, which gives rise to spark discharge. This spark discharge induces a pilot arc between the electrode 1a and nozzle 1b. The formation of the pilot arc creates a closed circuit path starting from the positive terminal of the constant current source 8 and passing through the resistor 12, the switch 10, nozzle 1b, the pilot arc, the electrode 1a, and finally returning to the negative terminal of the constant current source 8, whereby an initial low pilot current $I_S$ (e.g. about 10 A) flows through this path. Because the initial pilot current $I_S$ is as low as 10 A, the thermal shock to the electrode 1a is reduced, whereby the electrode wear during the arc start-up operation is suppressed. However, if the distance between the workpiece and the tip of the plasma torch 1 is great, it can be impossible to perform the transition from the pilot arc to the main arc 13 at the initial low pilot current $I_S$. To avoid this problem, when the pilot current detector 14b detects the initial pilot current $I_S$, the first stop valve 4 is opened so as to gradually increase the gas flow rate Q from the low level $Q_P$ to the normal flow rate $Q_M$ (e.g., about 50 liters/min). At the same time, the pilot current is gradually increased from the initial pilot current level $I_S$ to the pilot current level $I_P$ (e.g. about 50 A) which can provide a stable arc even for the normal flow rate $Q_M$. These gradual changes in the gas flow rate and the current are performed for a time period of about 1 sec for the gas flow rate, and for a time period of about 100-300 msec for the current. In the case where the pilot current level $I_P$ is set to 50 A, the maximum distance between the workpiece 11 and the nozzle 1b which allows the transition to the main arc can be as large as 20 mm. In this arrangement, as described above, the bypass pipe 5, containing the gas regulator 6 and the second stop valve 7, enables the gas flow rate Q to be switched between two levels, and at the same time, the pilot current is gradually increased from $I_S$ to $I_P$, whereby the thermal shock is reduced and a stable pilot arc can be obtained. If the pilot current $I_P$ is set to 10 A which is equal to the value of $I_S$, then the maximum distance which allows the transition to the main arc is only 5 mm or less.

Then, an electrical path between the electrode 1a and the workpiece 11 is induced by the pilot arc. Thus, a current begins to flow through the workpiece 11. When the main current detector 14c detects this current between the electrode 1a and the workpiece 11, the switch 10 is opened by controller 15 so as to disconnect the current path through the nozzle 1b, thereby turning off the pilot arc. As a result, the current will flow only via the path including the main arc 13 between the electrode 1a and the workpiece 11. After that, the arc current is gradually increased from the pilot current level $I_P$ (e.g. about 50 A) to the cutting current level $I_M$ (e.g. about 250 A) so as to start the cutting operation. If a stop signal $S_P$ is inputted to the controller 15 after the cutting operation is complete, the arc current is gradually reduced from the cutting current level $I_M$ to a lower level $I_D$ (e.g., about 20 A) during a time period of about 0.5 sec. After that, the constant current source 8 is turned off so as to extinguish the main arc, and the first stop valve 4 is closed, thereby reducing the gas flow rate Q to the lower level $Q_P$. In this state, afterflow is permitted via the bypass line 5 containing gas flow regulating means 6 and second stop valve 7, and then the second stop valve 7 is closed so as to completely terminate the supply of gas to the plasma torch 1.

In this way, the thermal shock to the electrode 1a, which occurs during the starting operation of the pilot arc, and during the transition to the main arc 13, is reduced. Besides, the electrode 1a is not subjected to rapid cooling when the main arc 13 is extinguished, whereby the cracking on the surface of the electrode 1a can be prevented or at least reduced, and thus the reduction in the thermal conductivity due to the cracking is minimized or does not occur. Thus, the life of the electrode 1a is improved.

Figure 8:
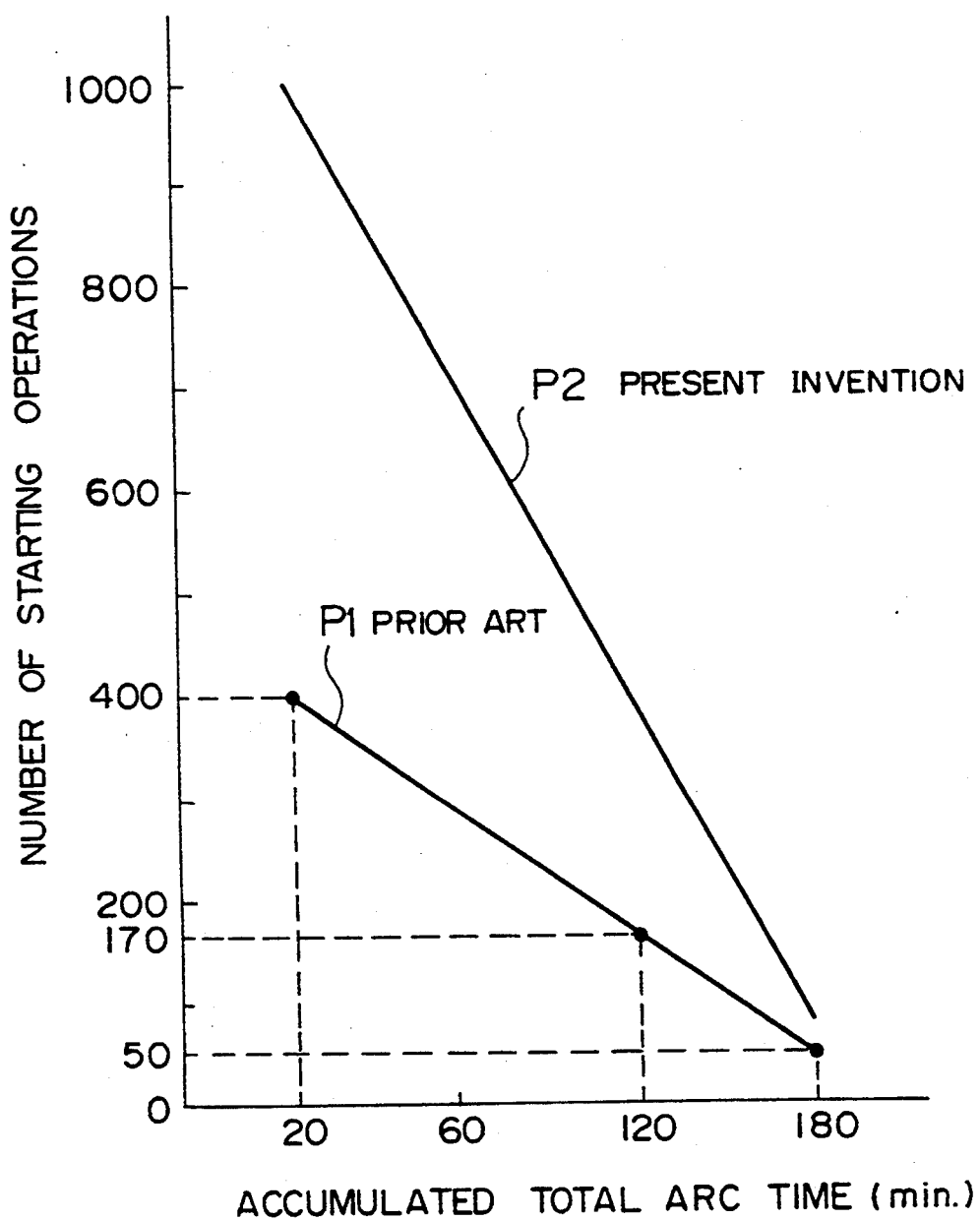
FIG. 8 is a graph illustrating relationships between the arc starting operation number and the accumulated total arc time for the present invention and the conventional technique.

Both the first and second aspects of the present invention are embodied in the arrangement described above, that is, the control regarding the starting operation of the pilot arc and the transition to the main arc according to the first aspect and the control regarding the extinction operation of the main arc according to the second aspect are combined. Alternatively, only one of these controls may be performed as required. Experiments show that the present embodiment can provide a longer electrode life which is at least twice that in the conventional technique. FIG. 8 shows the results of the evaluation tests. The results of the present embodiment are represented by the solid line P2. As can be seen, even if the starting operation of the arc is repeated 1000 times, one electrode 1a can be used for 20 min in accumulated total arc time. As a result, it becomes possible to reduce the frequency of the electrode replacement, whereby the working efficiency is improved, and the running cost associated with the electrode replacement is reduced.

Figure 3:
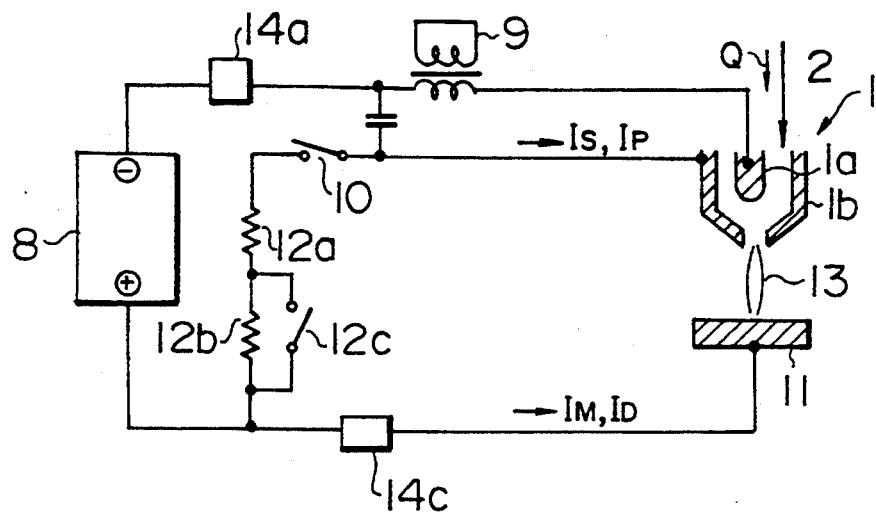
FIG. 3 is a schematic diagram illustrating major parts of a plasma arc cutting machine according to a third aspect of the present invention.

Referring to the accompanying drawings, preferred embodiments of a control apparatus for controlling a plasma arc cutting machine according to the third aspect of the present invention will be described below. FIG. 3 shows only major parts which directly relate to the third aspect of the present invention, and the controller 15 and the control system for controlling the working gas supply are not shown in this figure. As elements in FIG. 3 which correspond to those in FIG. 1 are denoted by the same reference numerals, a detailed explanation thereof is not repeated. The constant current source has a plurality of switchable cutting current levels $(I_M)_n$ for the cutting current $I_M$. The configuration of the apparatus shown in FIG. 3 differs from that of FIG. 1 in that the resistor 12 (refer to FIG. 1) connected to the nozzle 1b is replaced with serially connected resistors 12a and 12b, an open-and-close switch 12c is connected in parallel with the resistor 12b, and the pilot current detector 14b is omitted.

Figure 4:
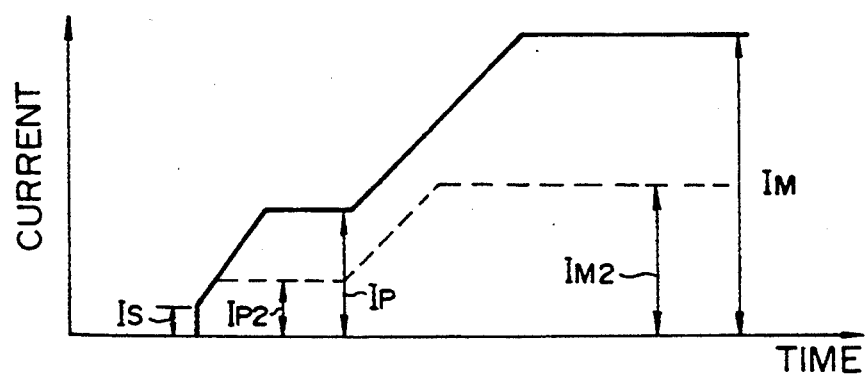
FIG. 4 is a graph illustrating the switching of the current in the plasma arc cutting machine according to the third aspect of the present invention.
Figure 5:
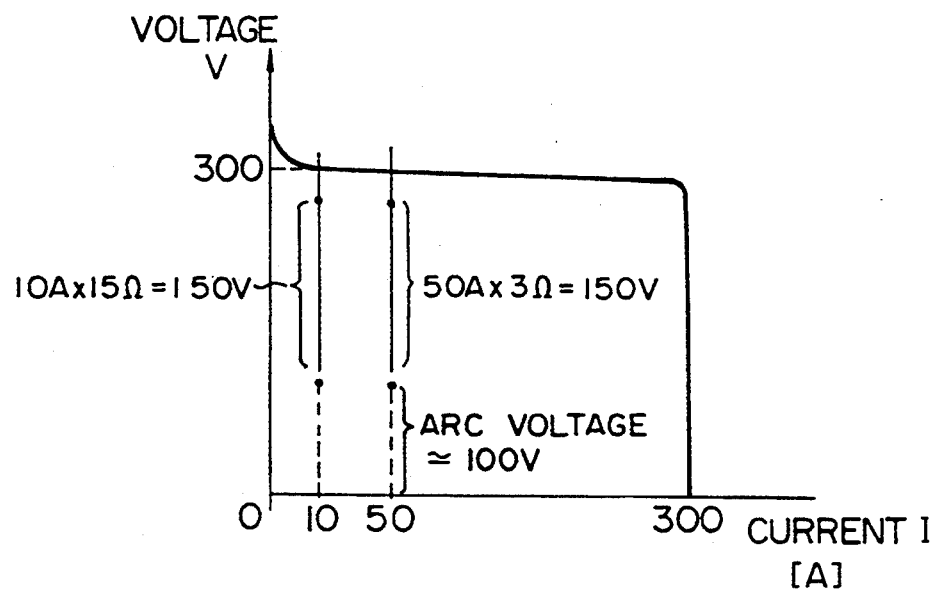
FIG. 5 is a graph relating to the selection of resistance used in the plasma arc cutting machine according to the third aspect of the present invention.
Figure 6:
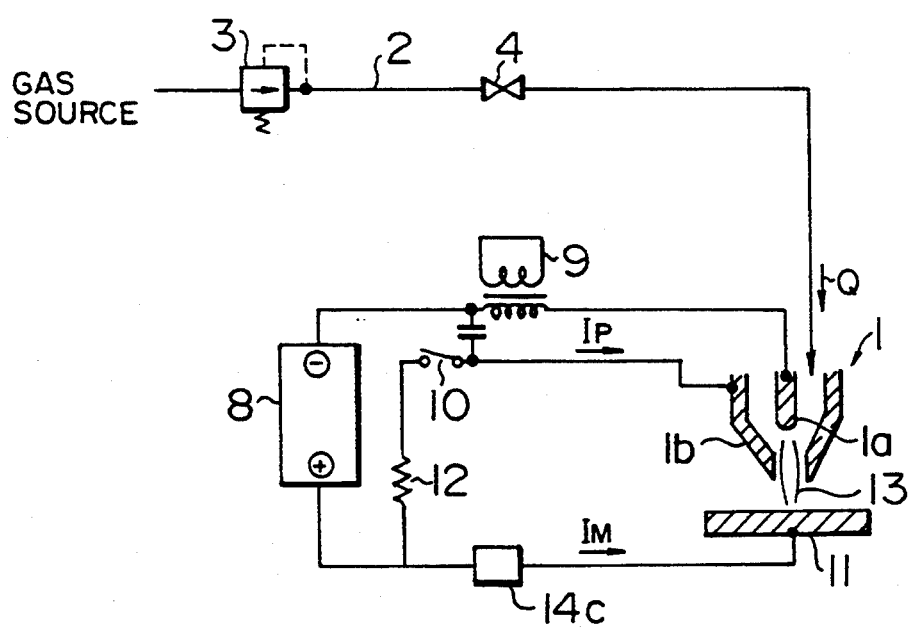
FIG. 6 is a schematic diagram illustrating a configuration of a conventional plasma arc cutting machine.
Figure 7:
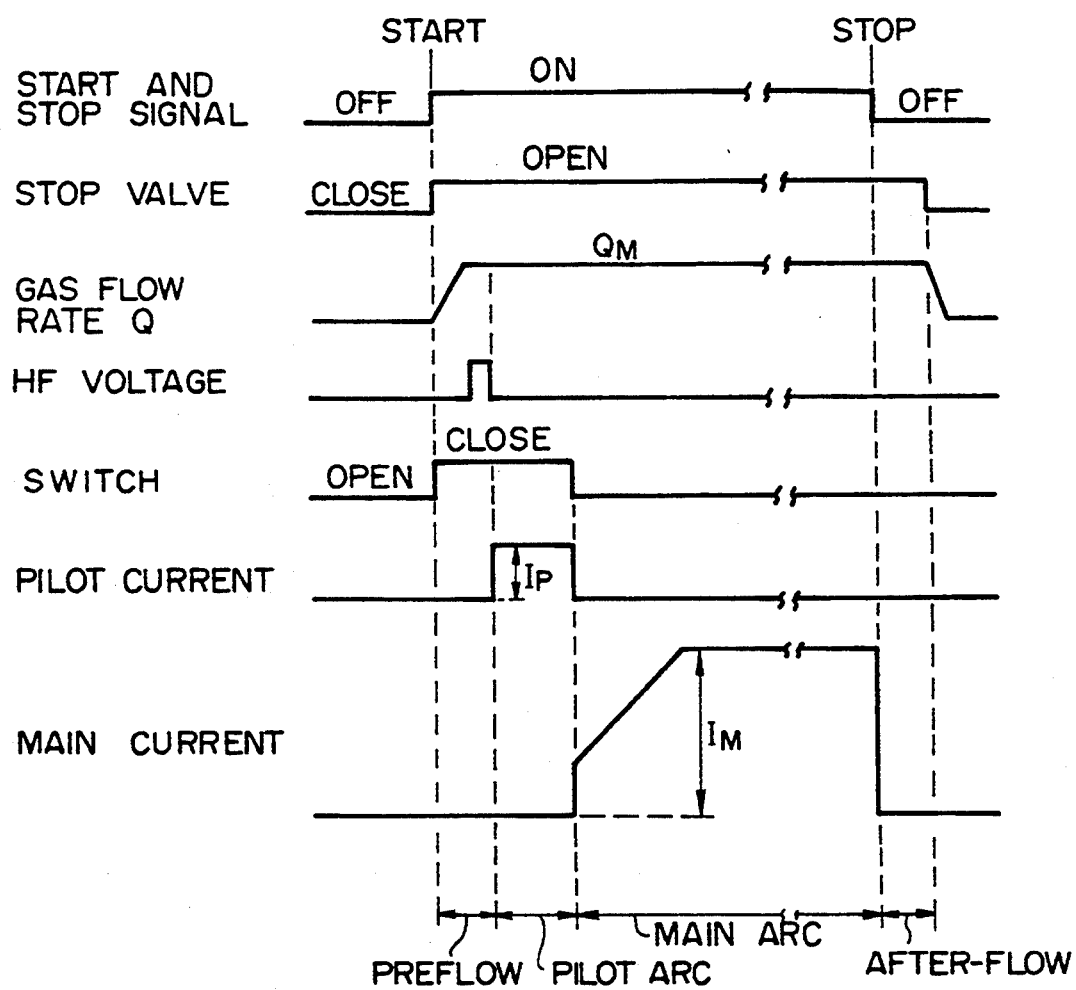
FIG. 7 is a timing chart illustrating the sequential control of the starting of an arc of the conventional plasma arc cutting machine.

Referring to FIGS. 3 and 4, the present embodiment will be described further. In the following description, it is assumed that a plasma arc cutting machine, which is designed for cutting thick plates with a nozzle having a orifice diameter of 2.8 mm, and which is capable of providing a cutting current $I_M$ of 300 A and a pilot current $I_P$ of 50 A while using gaseous oxygen as the working gas, is altered for use in the cutting of thin plate, with a nozzle having an orifice diameter of 0.8 mm, wherein this plasma arc cutting machine can provide a cutting current $I_M$ of 50 A ($I_{M2}$) and a pilot current $I_P$ of 10 A ($I_{P2}$). When a thick plate is cut with this machine, the switch 12c is closed so as to short-circuit the resistor 12b (e.g., R=12 Ω) whereby the current path includes only a resistor 12a (e.g., R=3 Ω). On the other hand, when a thin plate is cut, the switch 12c is opened so as to have a series connection comprising the resistors 12a and 12b (e.g., total R=15 Ω). Owing to such an arrangement, when the pilot current $I_P$ is reduced from 50 A to 10 A ($I_{P2}$) to cut a thin plate, the voltage difference between the nozzle 1b and the workpiece 11 is still maintained at 150 V, a value large enough to avoid the difficultly in the transition from the pilot arc to the main arc. Preferably, the resistance is selected so that available maximum voltage can be obtained with a certain margin. In this embodiment, as can be seen from FIG. 5, the available maximum output voltage of the constant current source 8 is 300 V, whereas the pilot arc voltage is about 100 V for both pilot currents $I_P$: 50 A and 10 A. Therefore, the remaining available voltage is 200 V (=300 V − 100 V). If a margin of 50 V is further subtracted from this remaining available voltage, then we have 150 V for voltage drop across the series connection of the resistors 12a and 12b due to the current $I_P$ flowing the resistors. As for the gradual increasing of the pilot current from the initial pilot current level $I_S$ to the pilot current level $I_{P2}$; the gradual increasing of the arc current to the cutting current level $I_M$; and the gradual decreasing of the arc current from the cutting current level $I_M$ to a lower level $I_D$; all of these changes are performed in the same manner as that in the embodiments according to the first and second aspects of the present invention. The working gas is also supplied in the same manner as that in the embodiments according to the first and second aspects of the present invention.

If a conventional plasma arc cutting machine designed for use in the cutting of thick plates is directly applied to the cutting of thin plates, good cutting is impossible for the reasons described earlier. In contrast, in the present embodiment, no reduction in the voltage difference between the nozzle 1b and the workpiece 11 occurs in the cutting of a thin plate, and the voltage difference can be maintained at an adequate value. As a result, even if the plasma torch 1 is disposed at a rather high position, a smooth transition to the main arc is possible. In conclusion, high quality cutting is possible with little wear of the electrode 1a and the nozzle 1b.

The above embodiment can be modified to be applicable to general applications as will be described below. In the above embodiment, the pilot current $I_P$, the cutting current $I_M$, and the resistance 12 each can be set to two different values. Instead, in this modified example of a controlling apparatus for controlling a plasma arc cutting machine, each of the pilot current, the cutting current, and the resistance 12 has a plurality number n of switchable values, $(I_M)n$, $(I_P)n$, and 12n, respectively. In this arrangement, an optimum combination of these values can be selected depending on the thickness of a plate to be cut, which is practically more useful than the above embodiment. In practice, it is more preferable that the resistor 12n comprises one or a few variable resistors instead of a plurality number n of individual resistors.

A preferred embodiment of a method of controlling a plasma arc cutting machine, according to the fourth aspect of the present invention will be described below.

The above-described embodiments according to the first and second aspects of the present invention can be summarized in that: a plasma arc cutting machine and a method of controlling it are provided in which the output current is detected by the pilot detector 14b and the main detector 14c or by the output current detector 14a; and the output current is constant-current-controlled so that the currents detected by the above detectors become equal to specified values $I_S$, $I_P$, $I_M$, and $I_D$. When the cutting is performed with the above plasma arc cutting machine under conditions such that the cutting current $I_M$ is 300 A, the oxygen gas flow rate is 50 liters/min, and there is a variation in the output current having a frequency 10 kHz which arises from the constant current control, the noise level, measured at a location 1 m distant from the noise source, is 115 dB(A).

A plasma arc cutting machine used in the present embodiment is basically the same as that shown in FIG. 1 except that the frequency of the current variation arising from the ON/OFF control of the switching device in the constant current source 8 is higher than 12 kHz, and the magnitude of the current variation relative to the average value is less than 30%. When the constant current source 8 is a switching-type DC power supply employing transistors as ON/OFF switches, the switching transistors can operate at ultrasonic switching. Thus, if desired the frequency of the current variation arising from the ON/OFF control of the switching device in the constant current source 8 can be higher than 20 kHz. The cutting current $I_M$ and the flow rate of oxygen gas can be the same as those in the previous embodiments. The value of the output current is detected and compared with a predetermined value, and the switching device of the switching-type DC power supply is operated responsive to the comparison of the detected value of the output current with the predetermined value so that the frequency of the resulting variations in the value of the output current associated with the operation of the switching device is higher than 12 kHz and the magnitude of the resulting variations in the value of the output current is less than 30% of an average value of the output current, and so that the output current is maintained at least substantially equal to the predetermined value. With the above arrangement, the noise generated during the cutting operation as measured at a location 1 m distant from the noise source is reduced by 5 dB (A) or greater. This is because the frequency of the current variation can be higher than the audible frequencies or at least the more sensitive frequencies, and the magnitude of the current variation is controlled to a smaller value. The present invention can be applied to a plasma arc cutting machine according to the third aspect of the present invention, or to a plasma arc cutting machine which has at least one current detecting means and a switching device for controlling a current at a constant value.

I claim:

1. A method of controlling a plasma arc cutting machine having a plasma torch, said method comprising the steps of:

supplying, in response to a start signal $S_T$, a working gas to the plasma torch at a small initial flow rate $Q_P$, the working gas comprising gaseous oxygen;

starting, while the working gas is being supplied to the plasma torch at said small initial flow rate $Q_P$, a pilot arc in said plasma torch with an arc current having an initial pilot current level $I_S$;

after starting said pilot arc, gradually increasing the supply of said working gas to the plasma torch from said small flow rate $Q_P$ to a normal flow rate $Q_M$, which is greater than said small flow rate $Q_P$, and gradually increasing the arc current from the initial pilot current level $I_S$ to a pilot current level $I_P$ to start a main arc, said pilot current level $I_P$ being greater than said initial pilot current level $I_S$;

after the starting of the main arc, performing a cutting operation with the main arc while maintaining the arc current at a predetermined cutting current level $I_M$ which is greater than said pilot current level $I_P$; and when said cutting operation is finished, extinguishing said main arc.

2. A method of controlling a plasma arc cutting machine in accordance with claim 1, wherein the step of performing a cutting operation includes maintaining the flow rate of working gas to the plasma torch at said normal flow rate $Q_M$.

3. A method of controlling a plasma arc cutting machine in accordance with claim 1, wherein the step of extinguishing said main arc comprises the steps of:

gradually reducing said arc current at a predetermined gradient from said cutting current level $I_M$ to a lower current level $I_D$; and extinguishing said main arc after said arc current is reduced from said cutting current level $I_M$ to said lower current level $I_D$.

4. A method of controlling a plasma arc cutting machine in accordance with claim 1, wherein the step of performing a cutting operation comprises:

gradually increasing said arc current from said pilot current level $I_P$ to said cutting current level $I_M$ after the starting of the main arc; and then maintaining said arc current at said cutting current level $I_M$ during a cutting operation.

5. A method of controlling a plasma arc cutting machine in accordance with claim 4, wherein the step of performing a cutting operation includes maintaining the flow rate of working gas to the plasma torch at said normal flow rate $Q_M$.

6. A method of controlling a plasma arc cutting machine in accordance with claim 4, wherein the step of extinguishing said main arc comprises the steps of:

gradually reducing said arc current at a predetermined gradient from said cutting current level $I_M$ to a lower current level $I_D$; and extinguishing said main arc after said arc current is reduced from said cutting current level $I_M$ to said lower current level $I_D$.

7. A method of controlling a plasma arc cutting machine in accordance with claim 6, wherein the step of extinguishing said main arc further comprises the step of maintaining the flow rate of working gas to the plasma torch at said normal flow rate $Q_M$ until the main arc is extinguished and then gradually reducing the flow rate of working gas to the plasma torch.

8. A method of controlling a plasma arc cutting machine in accordance with claim 6, wherein the step of performing a cutting operation includes maintaining the flow rate of working gas to the plasma torch at said normal flow rate $Q_M$.

9. A method of controlling a plasma arc cutting machine in accordance with claim 1, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

10. A method of controlling a plasma arc cutting machine in accordance with claim 2, wherein the step of extinguishing said main arc comprises the steps of:

gradually reducing said arc current at a predetermined gradient from said cutting current level $I_M$ to a lower current level $I_D$; and extinguishing said main arc after said arc current is reduced from said cutting current level $I_M$ to said lower current level $I_D$.

11. A method of controlling a plasma arc cutting machine in accordance with claim 2, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

12. A method of controlling a plasma arc cutting machine in accordance with claim 3, wherein the step of extinguishing said main arc comprises the steps of:

gradually reducing said arc current at a predetermined gradient from said cutting current level $I_M$ to a lower current level $I_D$; and extinguishing said main arc after said arc current is reduced from said cutting current level $I_M$ to said lower current level $I_D$.

13. A method of controlling a plasma arc cutting machine in accordance with claim 3, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

14. A method of controlling a plasma arc cutting machine in accordance with claim 4, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

15. A method of controlling a plasma arc cutting machine in accordance with claim 5, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

16. A method of controlling a plasma arc cutting machine in accordance with claim 8, wherein the step of extinguishing said main arc comprises the step of maintaining the flow rate of working gas to the plasma torch at said normal flow rate $Q_M$ until the main arc is extinguished and then gradually reducing the flow rate of working gas to the plasma torch.

17. In a method of controlling a plasma arc cutting machine, said method comprising the steps of:

opening a first stop valve so as to supply a working gas to a plasma torch at a normal flow rate $Q_M$;

starting a pilot arc and then supplying a pilot current level $I_P$ to form a main arc;

performing a cutting operation while maintaining a main arc current at a predetermined cutting current level $I_M$; and when said cutting operation is finished, extinguishing said main arc in response to a stop signal $S_P$;

the improvement comprising the combination of the steps of:

opening a second stop valve, which is disposed in parallel to said first stop valve, in response to a start signal $S_T$ so as to supply the working gas to said plasma torch at a small flow rate $Q_P$, which is less than said normal flow rate $Q_M$, before said first stop valve is opened, the working gas comprising gaseous oxygen;

starting said pilot arc with an arc current having an initial pilot current level $I_S$ which is less than said pilot current level $I_P$;

after starting said pilot arc, opening the first stop valve so as to gradually increase the flow rate of the working gas from said small flow rate $Q_P$ up to said normal flow rate $Q_M$ and gradually increasing the arc current from the initial pilot current level $I_S$ to said pilot current level $I_P$ in a manner corresponding to the gradual increase in the flow rate of the working gas up to said normal flow rate $Q_M$.

18. A method of controlling a plasma arc cutting machine in accordance with claim 17 wherein the combination of steps further comprises the steps of:

gradually reducing said main arc current at a predetermined gradient from said cutting current level $I_M$ to a lower current level $I_D$ in response to said stop signal $S_P$; and extinguishing said main arc after said main arc current is reduced from said cutting current level $I_M$ to said lower current level $I_D$.

19. A method of controlling a plasma arc cutting machine in accordance with claim 18, further comprising maintaining the flow rate of working gas to the plasma torch at said normal flow rate $Q_M$ during the performing of the cutting operation.

20. A method of controlling a plasma arc cutting machine in accordance with claim 17, wherein the combination of steps further comprises the steps of:

gradually increasing said arc current from said pilot current level $I_P$ to said cutting current level $I_M$; and then maintaining said arc current at said cutting current level $I_M$ during a cutting operation.

21. A method of controlling a plasma arc cutting machine in accordance with claim 20, wherein the combination of steps further comprises the steps of:

gradually reducing said main arc current at a predetermined gradient from said cutting current level $I_M$ to a lower current level $I_D$ in response to said stop signal $S_P$; and extinguishing said main arc after said main arc current is reduced from said cutting current level $I_M$ to said lower current level $I_D$.

22. In a method of controlling a plasma arc cutting machine, said method comprising the steps of:

forming a main arc;

performing a cutting operation while maintaining a main arc current at a predetermined cutting current level $I_M$; and when said cutting operation is finished, extinguishing said main arc in response to a stop signal $S_P$;

the improvement comprising the combination of the steps of:

gradually reducing said main arc current at a predetermined gradient from said cutting current level $I_M$ to a lower current level $I_D$ in response to said stop signal $S_P$; and extinguishing said main arc after said main arc current is reduced from said cutting current level $I_M$ to said lower current level $I_D$.

23. A method of controlling a plasma arc cutting machine in accordance with claim 22 wherein the improvement further comprises the step of maintaining a flow rate of working gas to the plasma torch at a normal flow rate $Q_M$ after said stop signal $S_P$ until the main arc is extinguished and then gradually reducing the flow rate of working gas to the plasma torch.

* * * * *

UNITED STATES PATENT AND TRADEMARK OFFICE
CERTIFICATE OF CORRECTION

PATENT NO. : 5,424,507
DATED : June 13, 1995
INVENTOR(S) : Yoshihiro YAMAGUCHI

It is certified that error appears in the above-indentified patent and that said Letters Patent is hereby corrected as shown below:

Column 14, line 20, change "claim 3" to --claim 11--.

Signed and Sealed this

Twelfth Day of September, 1995

Attest:

BRUCE LEHMAN

Attesting Officer    Commissioner of Patents and Trademarks